July 23, 1940.  H. E. HARTIG  2,208,760
LOAD COMPENSATED CONTROL SYSTEM
Filed Nov. 23, 1936  2 Sheets-Sheet 2

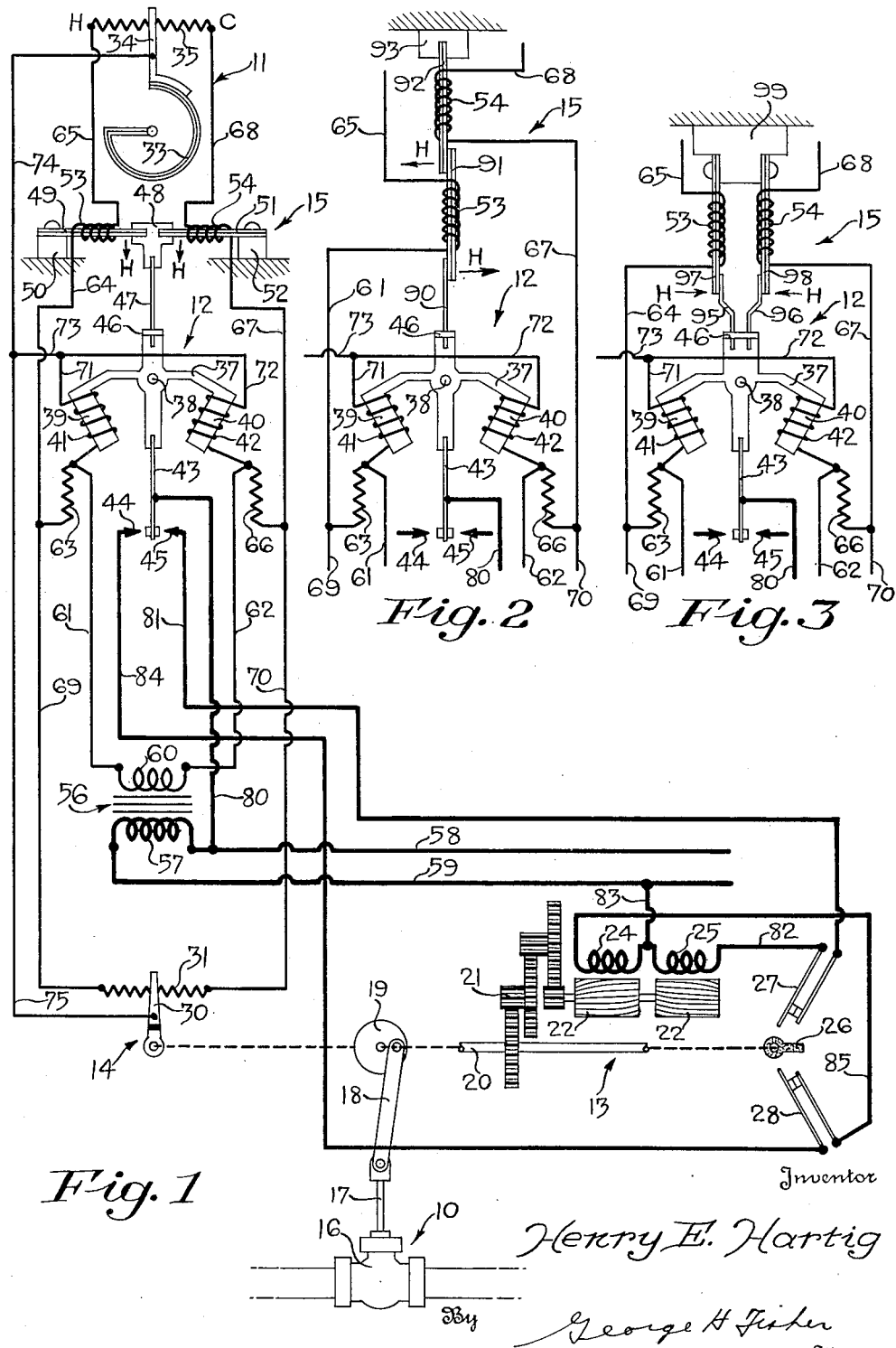

Inventor
Henry E. Hartig.
By George H. Fisher
Attorney

Patented July 23, 1940

2,208,760

UNITED STATES PATENT OFFICE 2,208,760

LOAD COMPENSATED CONTROL SYSTEM

Henry E. Hartig, Robbinsdale, Minn., assignor to Minneapolis-Honeywell Regulator Company, Minneapolis, Minn., a corporation of Delaware Application November 23, 1936, Serial No. 112,338

13 Claims. (Cl. 236—78)

This invention relates to automatic reset or load compensation mechanism in general and more particularly to that type of mechanism as applied to a follow-up control system.

It is an object of this invention to provide a follow-up control system of the electrical type utilizing a relay for positioning a device in accordance with changes in the value of a condition along with a reset or load compensation mechanism operative as an incident to deviations of the condition to be controlled from the desired normal value for mechanically operating the relay to maintain the value of the condition to be controlled closer to the desired normal value.

Another object of this invention is to provide a novel adjusting means for a reset mechanism whereby the rate of reset may be adjusted at will.

Other objects and advantages will become apparent to those skilled in the art upon reference to the accompanying specification, claims and drawings.

For a more thorough understanding of this invention, reference is made to the accompanying drawings in which:

Figure 1 diagrammatically shows an electrical type of follow-up system with one form of reset mechanism applied thereto;

Figures 2 and 3 show modified forms of the reset mechanism which may be utilized in the follow-up system of Figure 1;

Figure 4:
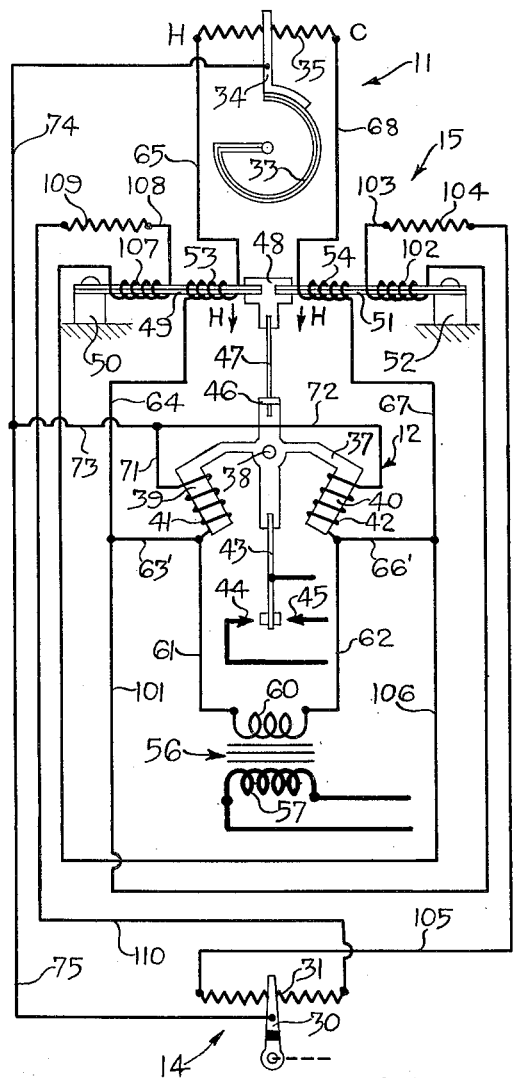
Figure 4 is a partial diagrammatic view showing a further modified form of the reset mechanism in combination with the follow-up control system.

Referring now to Figure 1, a device to be positioned in a plurality of positions for controlling the value of a condition is generally designated at 10. Control means the state of which is varied in accordance with changes in the value of the condition is generally indicated at 11. The control means 11 is adapted to operate a relay generally designated at 12. The relay 12 controls the operation of a motor generally designated at 13. The motor 13 positions the device 10 and also operates a follow-up means generally designated at 14 which, in turn, controls the operation of the relay 12 to provide a follow-up control system. An automatic reset or load compensation mechanism is generally designated at 15 for mechanically adjusting the relay 12 to maintain the condition to be controlled within narrower limits.

Although the control system of this invention may be utilized for controlling the value of any condition, it is disclosed for purposes of illustration as controlling a temperature condition and more particularly the temperature of a space (not shown). Therefore, the device 10 which is positioned in a plurality of positions is shown to be a valve 16 for controlling the supply of heating fluid to the space. The valve 16 may be operated by a valve stem 17 connected by a pitman 18 to a crank disc 19 carried by a shaft 20 of the motor 13. The shaft 20 is operated through a reduction gear train 21 by motor rotors 22 and 23. The rotors 22 and 23 are operated by field windings 24 and 25, the arrangement being such that when field winding 25 is energized, the valve 16 is moved toward an open position and when the field winding 24 is energized, the valve 16 is moved toward a closed position.

The shaft 20 operates an abutment member 26 preferably made of insulating material for opening limit switches 27 and 28 when the valve 16 is moved to either an extreme open position or an extreme closed position, respectively. The shaft 20 also operates a slider 30 with respect to a potentiometer resistance element 31. The slider 30 and the resistance element 31 form a balancing potentiometer, the operation of which will be pointed out more fully hereafter. When the valve 16 is moved toward an open position, the slider 30 is moved to the left and when the valve 16 is moved toward a closed position, the slider 30 is moved to the right.

The control means generally designated at 11 is shown to be a thermostatic control means having a thermostatic element 33 responsive to variations in space temperature. Thermostatic element 33 operates a slider 34 with respect to a potentiometer resistance element 35. The slider 34 and the potentiometer resistance element 35 form a control potentiometer. Upon a decrease in space temperature, the slider 34 is moved to the right in the direction indicated by the character C and upon an increase in space temperature, the slider 34 is moved to the left in the direction indicated by the character H.

The relay generally designated at 12 may comprise an armature 37 pivoted at 38. The armature 37 carries cores 39 and 40 which are operated by relay coils 41 and 42. The armature 37 carries a switch arm 43 to be moved into engagement with spaced contacts 44 and 45. When the relay coil 41 is energized more than the relay coil 42, the switch arm 43 is moved into engagement with the contact 45 and when the relay coil 42 is energized more than the relay coil 41, the switch arm 43 is moved into engagement with the contact 44. When the relay coils 41 and 42 are equally energized, the switch arm 43 is maintained spaced midway between the contacts 44 and 45 as shown in Figure 1.

The armature 37 carries a lug 46 having an aperture therein through which extends a spring arm 47 carried by a member 48. The member 48 is, in turn, carried by and operated by bimetallic elements 49 and 51 which are suitably secured to stationary supports 50 and 52, respectively. The bimetallic elements 49 and 51 are heated by heaters 53 and 54. When the heaters 53 and 54 are equally energized, the member 48 and the spring arm 47 are in a mid position as shown in the drawings and have no effect whatsoever on the armature 37. When the heater 54 becomes more highly energized than the heater 53, the bimetallic element 51 flexes downwardly in the direction indicated by the character H to move the member 48 and the spring arm 47 in a clockwise direction to force the switch arm 43 in engagement with the contact 45. When the heater 53 becomes more highly energized than the heater 54, the thermostatic element 49 flexes downwardly in the direction indicated by the character H and rotates the member 48 and the spring arm 47 in a counterclockwise direction. This resiliently urges the switch arm 43 into engagement with the contact 44. Since a time interval exists between the time the energizations of the heaters 53 and 54 are changed and the time this change is felt by the thermostatic elements 49 and 51, the switch arm 43 will not immediately be forced into engagement with the contacts 44 and 45.

Power is supplied to the relay 12 by means of a step-down transformer 56 having a primary 57 connected across line wires 58 and 59 and a secondary 60. One end of the secondary 60 is connected by a wire 61 to one end of the relay coil 41 and the other end of the secondary 60 is connected by a wire 62 to one end of the relay coil 42. The same end of the relay coil 41 is connected by a protective resistance 63 and a wire 64 to one end of the heater 53 and the other end of the heater 53 is connected by a wire 65 to the left end of the control potentiometer resistance element 35. The same end of the relay coil 42 is connected by a protective resistance 66 and a wire 67 to one end of the heater 54 and the other end of the heater 54 is connected by a wire 68 to the right end of the control potentiometer resistance element 35. The protective resistances 63 and 66 are also connected by wires 69 and 70 to the left and right ends, respectively, of the balancing potentiometer resistance element 31. The other ends of the relay coils 41 and 42 are connected together by wires 71 and 72 and are connected by wires 73, 74 and 75 to the slider 34 of the control potentiometer and the slider 30 of the balancing potentiometer. By reason of these wiring connections, it is seen that the control potentiometer and the balancing potentiometer are connected in parallel with the series connected relay coils 41 and 42, and that the control potentiometer, the balancing potentiometer and the series connected relay coils 41 and 42 are connected across the secondary 60. It is also seen that the heaters 53 and 54 are connected in series with the left and right ends of the control potentiometer resistance element 35, respectively.

Omitting for the time being the operation of the heaters 53 and 54 of the reset mechanism 15, it is assumed that the parts are in the position shown in Figure 1. That is, the space temperature is at the desired normal value and that the valve 16 is in a mid position for supplying just the correct amount of heat to the space to make up for the heat losses from the space. Upon an increase in the heating load, the space temperature decreases to move the slider 34 of the control potentiometer to the right in the direction indicated by the character C. By reason of the parallel relationship pointed out above, this right-hand movement of the slider 34 increases the current flow through the relay coil 41 and decreases the current flow through the relay coil 42 to cause the relay coil 41 to become more highly energized than the relay coil 42. As a result of these unequal energizations of the relay coils 41 and 42, the switch arm 42 is moved into engagement with the contact 45 to complete a circuit from the line wire 58 through wire 80, switch arm 43, contact 45, wire 81, limit switch 27, wire 82, field winding 25, and wire 83 back to the other line wire 59. Completion of this circuit energizes the field winding 25 to move the valve 16 towards an open position to increase the supply of heat to the space. Operation of the motor 13 to move the valve 16 towards an open position also causes left-hand movement of the slider 30 of the balancing potentiometer. This left-hand movement of the slider 30 increases the current flow through the relay coil 42 and decreases the current flow through the relay coil 41. When the slider 30 has moved sufficiently far to the left to rebalance the energization of the relay coils 41 and 42, the switch arm 43 is moved out of engagement with the contact 45 to break the circuit through the field winding 25. In this manner, the valve 16 is modulated toward an open position in direct accordance with the amount of decrease in space temperature.

Upon a decrease in the heating load, the space temperature increases and the slider 34 is moved toward the left in the direction indicated by the character H. This left-hand movement of the slider 34 increases the current flow through the relay coil 42 and decreases the current flow through the relay coil 41 to increase the energization of the relay coil 42 and decrease the energization of the relay coil 41. As a result of these unequal energizations of the relay coils 42 and 41, the switch arm 43 is moved into engagement with the contact 44 to complete a circuit from the line wire 58 through wire 80, switch arm 43, contact 44, wire 84, limit switch 28, wire 85, field winding 24, and wire 83 back to the other line wire 59. Completion of this circuit energizes the field winding 24 to move the valve 16 toward a closed position which decreases the supply of heat to the space. Operation of the motor 13 to move the valve 16 towards a closed position causes right-hand movement of the slider 30 of the balancing potentiometer. This right-hand movement of the slider 30 increases the current flow through the relay coil 41 and decreases the current flow through the relay coil 42 and when the slider 30 has moved sufficiently far to the right to rebalance the energization of the relay coils 41 and 42, the switch arm 43 is moved out of engagement with contact 44 to break the circuit through the field winding 24. In this manner, the valve 16 is modulated toward a closed position in direct accordance with the amount of increase in space temperature.

By reason of the above construction, a true follow-up system of the electrical type is provided. It is found that if the control range of the control potentiometer is made sufficiently narrow to give an accurate temperature control action, "hunting" is likely to occur. Also, it is found that if the control range of the control potentiometer is made sufficiently wide to eliminate "hunting" a "droop" in the space temperature occurs. That is, the space temperature is maintained at a lower value when the heating load is relatively great than when the heating load is relatively light. In order to eliminate "hunting" and to minimize this "drooping" characteristic, the automatic reset mechanism generally designated at 15 is utilized and the operation of this reset mechanism 15 taken in connection with the follow-up control system is as follows:

Upon an increase in the heating load, the space temperature decreases and the slider 34 is moved to the right in the direction indicated by the character C. The valve 16 is moved toward an open position in accordance with the amount of decrease in space temperature in the manner pointed out above. This movement of the slider 34 to the right increases the current flow through the heater 54 and decreases the current flow through the heater 53 and after the lapse of a time interval, the thermostatic element 51 flexes downwardly in the direction indicated by the arrow H and the thermostatic element 49 flexes upwardly. This moves the spring arm 47 to the left to urge resiliently the switch arm 43 into engagement with the contact 45 which moves the valve 16 further towards an open position. Movement of the valve 16 further towards an open position causes left-hand movement of the slider 30 to increase the energization of the relay coil 42 and decrease the energization of the relay coil 41. When the slider 30 has moved sufficiently far to the left to overcome the resilient biasing action of the spring arm 47, the switch arm 43 is moved out of engagement with the contact 45 and further opening movement of the valve 16 is prevented. In this manner, the valve 16 is modulated toward an open position in accordance with the amount of increase in space temperature and is moved further towards an open position by the action of the reset mechanism 15 to increase the supply of heat to the space to make up for the increased heating load.

Upon a decrease in the heating load, the space temperature is increased and the slider 34 is moved to the left in the direction indicated by the character H. The valve 16 is modulated toward a closed position in the manner pointed out above in direct accordance with the amount of increase in space temperature. This left-hand movement of the slider 34 also increases the current flow through the heater 53 and decreases the current flow through the heater 54 and after the lapse of a time interval, the thermostatic element 49 flexes downwardly in the direction indicated by the arrow H and the thermostatic element 51 flexes upwardly to cause movement of the spring arm 47 to the right which, in turn, resiliently urges the switch arm 43 into engagement with the contact 44. The field winding 24 is thereupon energized and the valve 16 is moved further towards a closed position to decrease the supply of heat to the space to compensate for the decrease in heating load. Movement of the valve 16 towards a closed position causes right-hand movement of the slider 30 of the balancing potentiometer to increase the current flow through the relay coil 41 and decrease the current flow through the relay coil 42. When the slider 30 has moved sufficiently far to the right to overcome the resilient biasing action of the spring arm 47, the switch arm 43 is moved out of engagement with the contact 44 and the circuit through the field winding 24 is broken. In this manner, the valve 16 is moved toward a closed position in accordance with the amount of increase in space temperature and is moved further toward a closed position in accordance with the amount of decrease in heating load.

By reason of this construction, the control range of the control potentiometer may be made sufficiently wide to prevent "hunting" and yet the "drooping" characteristic of the control system is reduced to a minimum whereby the space temperature is maintained within closer limits regardless of changes in load. If the time interval between the time of change in energizations of the heaters 53 and 54 and the time their effect is sensed by the thermostatic elements 49 and 51 is properly selected or adjusted, the space temperature will be maintained at a substantially constant value.

Referring now to Figure 2, I have shown another manner for mechanically adjusting the relay 12 to compensate for changes in load. Like elements in Figures 1 and 2 have been designated by like reference characters. In Figure 2, the lug 46 carried by the armature 37 is engaged by a spring arm 90 which is connected to one end of a thermostatic element 91. The other end of the thermostatic element 91 is connected to one end of a thermostatic element 92 and the other end of the thermostatic element 92 is connected to a suitable stationary support 93. When the thermostatic element 92 is heated up, it flexes in the direction indicated by the arrow H and when the thermostatic element 91 is heated up, it flexes in the direction indicated by the arrow H. The thermostatic elements 91 and 92 are heated by heaters 53 and 54 in exactly the same manner as in Figure 1. When the space temperature decreases due to an increase in the heating load, the heater 54 becomes more highly energized than the heater 53 and as a result, the spring arm 90 is moved to the left to urge resiliently the switch arm 43 in engagement with the contact 45. When the space temperature increases as the result of a decrease in the heating load, the heater 53 becomes more highly energized than the heater 54 and the spring arm 90 is moved to the right to urge resiliently the switch arm 43 into engagement with the contact 44. In this manner, the construction of Figure 2 accomplishes exactly the same results as that of Figure 1 and, therefore, a further description is not considered necessary.

Figure 3 shows a modified form of reset mechanism for accomplishing the same results as are accomplished in Figures 1 and 2. Like reference characters have been used for like elements in Figures 1 and 3. In Figure 3, the lug 46 carried by the armature 37 is provided with an enlarged aperture or a plurality of apertures to receive springs arms 95 and 96. These spring arms 95 and 96 are carried by thermostatic elements 97 and 98 which are suitably secured to a stationary support 99. Thermostatic element 97 is heated by the heater 53 and the thermostatic element 98 is heated by the heater 54. As the thermostatic elements 97 and 98 are heated, they flex inwardly in the direction indicated by the arrows H. Upon an increase in heating load which causes a decrease in space temperature, the heater 54 becomes more highly energized than the heater 53 and the spring arms 95 and 96 are moved to the left to urge resiliently the switch arm 43 into engagement with the contact 45. Upon an increase in space temperature caused by a decrease in the heating load, the spring arms 95 and 96 are moved to the right to urge resiliently the switch arm 43 into engagement with the contact 44. In this manner, the reset mechanism of Figure 3 operates in exactly the same manner as the reset mechanism of Figure 1 and, therefore a further description is not considered necessary.

Figure 4 illustrates a modified form of reset mechanism wherein a slightly more accurate control is obtained than could be obtained by the construction shown in Figures 1, 2 and 3. Like elements of Figures 1 and 4 have been designated by like reference characters. In Figures 4, the relay coil 41 is connected by wires 63' and 101, heater 102, wire 103, resistance 104, and wire 105 to the left end of the balancing potentiometer resistance element 31. The relay coil 42 is connected by wires 66' and 106, heater 107, wire 108, resistance 109, and wire 110 to the right end of the balancing potentiometer resistance element 31. The heaters 102 and 107 also heat the bimetallic elements 49 and 51. When the valve 16 is moved toward an open position and the slider 30 is moved to the left upon an increase in the heating load as pointed out in connection with Figure 1, the current flow through the heater 102 is increased and the current flow through the heater 107 is decreased to urge further the switch arm 43 into engagement with the contact 45. As a result of the increased energization of the heater 102 and the decreased energization of the heater 107, the valve 16 is moved slightly further towards an open position to further increase the supply of heat to the space. In a like manner, valve 16 is moved toward a closed position and the slider 30 is moved toward the right as the result of a decrease in the heating load. The energization of the heater 107 is increased and the energization of the heater 102 is decreased to urge further the switch arm 43 into engagement with the contact 44. The heaters 102 and 107, therefore, act to move the valve 16 further towards an open or towards a closed position in accordance with the increase or decrease in the heating load whereby the "droop" of the control system in further decreased and the space temperature is maintained within narrower limits. Therefore, a slightly more accurate control is obtained by the means shown in Figure 4 than can be obtained by the means shown in Figures 1, 2 and 3. Even with the closer control afforded by Figure 4, "hunting" is substantially prevented. The resistances 104 and 109 are provided to decrease the heating effect of the heaters 102 and 107 to prevent "hunting" of the system. Since the heaters 107 and 102 are in series with the balancing potentiometer resistance element 31 and since the heaters 53 and 54 are in series with the control potentiometer resistance element 35, the protective resistances 63 and 66 of Figures 1, 2 and 3 are not needed. In other words, the heaters 102 and 107 and the heaters 53 and 54 protect the control system from being short-circuited.

Figure 5:
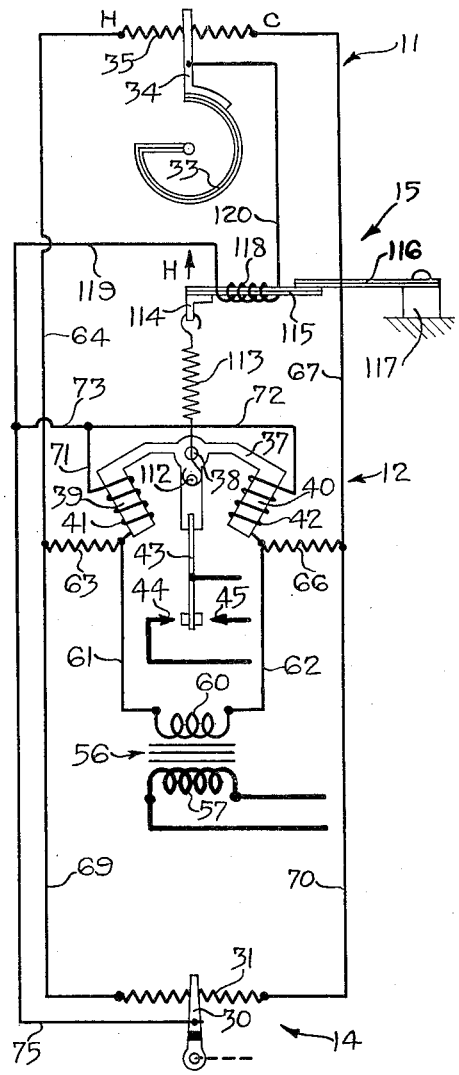
Figure 5 shows still another form of reset mechanism that may be utilized in the control system of Figure 1.

Figure 5 shows a different manner for accomplishing substantially the same results as are accomplished in Figures 1, 2 and 3. In Figure 5, the protective resistances 63 and 66 are connected directly by wires 64 and 67 to the left and right ends, respectively, of the control potentiometer resistance element 35. The armature 37 instead of being provided with a lug 46 it is provided with a pin 112 located below the pivot point 38. One end of spring 113 is connected to the pin 112 and the other end of the spring 113 is connected to a bracket 114 carried by a thermostatic element 115. Thermostatic element 115 is carried by an ambient temperature compensating thermostatic element 116 which is, in turn, suitably secured to a stationary support 117. A heater 118 is adapted to heat the thermostatic element 115. The junction of the relay coils 41 and 42 is connected by wires 73 and 119 to one end of the heater 118 and the other end of the heater 118 is connected by a wire 120 to the slider 34 of the control potentiometer. The control potentiometer, the balancing potentiometer and the series connected relay coils 41 and 42 are all connected in parallel in the manner pointed out in connection with Figure 1. The connection between the junction of the relay coils 41 and 42 and the slider 34 of the control potentiometer includes the heater 118. When the slider 34 of the control potentiometer is in the mid position, no current passes through the heater 118. The spring 113 is so arranged that when the current flow through heater 118 is zero, it is in a neutral condition and has no effect whatsoever upon the armature 37.

Upon an increase in the heating load, the space temperature decreases and the slider 34 is moved toward the right. By reason of the above parallel relationship, current then flows through heater 118 to cause heating of the thermostatic element 115 to flex the outer end thereof upwardly in the direction indicated by the arrow H. This places the spring 113 in tension and since it is connected to the armature 37 below the pivot point 38, the spring 113 resiliently urges the switch arm 43 into engagement with the contact 45. As long as the slider 34 of the control potentiometer is to the right of the mid position shown, the heater 118 will be energized and the switch arm 43 will be resiliently urged in engagement with the contact 45. By reason of this construction, the valve 16 is modulated toward an open position and is moved further toward an open position in accordance with the decrease in space temperature and the increase in heating load in the same general manner as pointed out in connection with Figure 1.

Upon a decrease in the heating load which causes an increase in space temperature, the slider 34 is moved to the left in the direction indicated by the character H to cause current flow through heater 118 to again flex upwardly the thermostatic element 115 to place the spring 113 in tension. Spring 113 therefore urges the switch arm 43 into engagement with the contact 44 to cause further closing movement of the valve 16. Therefore, the valve 16 is modulated toward a closed position in accordance with the increase in space temperature and is moved further towards the closed position in accordance with the decrease in heating load. The structure of Figure 5, therefore, accomplishes substantially the same results as are accomplished in Figures 1 to 3.

Since in Figures 1 to 4 the current flow through the heaters 53 and 54 is proportional to the amount of deviation in space temperature and since in Figure 5 the current flow through the heater 118 is proportional to the amount of deviation in space temperature, the amount that the valve 16 is repositioned or reset towards an open or closed position is dependent upon the amount of deviation in space temperature. It follows also that the rate at which the valve 16 is so repositioned or reset is proportional to the amount of deviation in space temperature.

Figure 6:
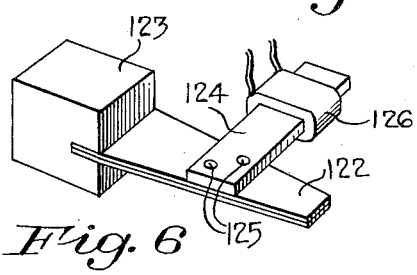
Figure 6 shows the manner in which the reset mechanisms of Figures 1 to 5 may be adjusted to vary the rate of reset.

In order to adjust the rate of reset and consequently the amount of reset of the valve 16, provision must be made for varying the time delay or time lag between the change in energization of the heaters 53, 54 and 118 and the time that these changes in energizations are felt by the thermostatic elements 49, 51 and 115. If the time delay is relatively long, the amount and rate of reset is less than if the time delay is relatively short. Figure 6 shows one manner in which this control of the time delay may be accomplished. For purposes of illustration, the thermostatic elements of Figures 1 to 5 are shown to be a bimetallic element 122 in Figure 6. The bimetallic element 122 is suitably secured to a stationary support 123. Secured to the bimetallic element 122 in any suitable manner, as by rivets 125, is a heat conducting member 124 and mounted on the heat conducting member 124 is a heater 126 which may correspond to the various heaters of Figures 1 to 5. The heat generated by the heater 126 is conducted through the member 124 to the bimetallic element 122. Therefore, the member 124 forms a heat conducting path. The time delay between the change in energization of heater 126 and the time in which the thermostatic element 122 senses this change is dependent upon the rate at which heat is conducted through the member 124. In order to change this rate of heat conduction for this time at which the thermostatic element 122 senses a change in the energization of the heater 126, members 124 of different materials may be substituted for the one shown. In other words, members of different heat conducting characteristics may be substituted for the member 124 to accomplish the desired results. Also, as shown in Figure 6, the heater 126 may be slidably mounted on the member 124 and if the heater 126 is moved to a position relatively close to the thermostatic element 122, a change in the energization thereof will be sensed more rapidly by the thermostatic element 122 than if the heater 126 were moved to a position more remote from the thermostatic element 122. Therefore, by reason of the construction of Figure 6 provision is made for adjusting the rate and amount of reset of the valve 16 and the structure of Figure 6 may be inserted in any of the Figures 1 to 5 for accomplishing the desired results.

Although for purposes of illustration I have shown several forms of this invention, it is obvious that other forms thereof may become obvious to those skilled in the art upon reference to this specification and, therefore, my invention is to be limited only by the scope of the appended claims and prior art.

I claim as my invention:

1. In combination, a device to be positioned in a plurality of positions for controlling the value of a condition, a control potentiometer, means for adjusting the control potentiometer in accordance with changes in the value of the condition to be controlled, said control potentiometer having a desired adjustment according to a desired normal value of the condition, a normally balanced relay for controlling said device, a balancing potentiometer adjusted by said device, connections between the relay, the control potentiometer and the balancing potentiometer for positioning said device in accordance with changes in the value of the condition to be controlled, resilient means mechanically connected to the relay for also controlling the operation thereof, thermostatic means for adjusting said resilient means, and electric heating means for the thermostatic means controlled by the current flow through said connections to position said device differently with respect to the value of the condition to be controlled.

2. In combination, a device to be positioned in a plurality of positions for controlling the value of a condition, a control potentiometer including a resistance element and a slider element, means for moving the elements with respect to each other in accordance with changes in the value of the condition to be controlled, a relay including an armature and a pair of series connected relay coils for controlling the operation of the device, first connections between the ends of the resistance element and one end of each relay coil, a second connections between the slider element and the junction of the relay coils, a balancing potentiometer including a resistance element and a slider element, means operated by said device for moving the elements of the balancing potentiometer with respect to each other, third connections between the ends of the balancing potentiometer and the first mentioned ends of the relay coils, fourth connections between the balancing potentiometer slider element and the junction of the relay coils whereby the device is positioned in accordance with variation in the value of the condition to be controlled, resilient means for mechanically adjusting the armature of the relay, and means responsive to the current flow through the first connections for adjusting the resilient means to position said device differently with respect to the value of the condition to be controlled.

3. In combination, a device to be positioned in a plurality of positions for controlling the value of a condition, a control potentiometer including a resistance element and a slider element, means for moving the elements with respect to each other in accordance with changes in the value of the condition to be controlled, a relay including an armature and a pair of series connected relay coils for controlling the operation of the device, first connections between the ends of the resistance element and one end of each relay coil, second connections between the slider element and the junction of the relay coils, a balancing potentiometer including a resistance element and a slider element, means operated by said device for moving the elements of the balancing potentiometer with respect to each other, third connections between the ends of the balancing potentiometer and the first mentioned ends of the relay coils, fourth connections between the balancing potentiometer slider element and the junction of the relay coils whereby the device is positioned in accordance with variation in the value of the condition to be controlled, resilient means for mechanically adjusting the armature of the relay, and means responsive to the current flow through the second connections for adjusting the resilient means to position said device differently with respect to the value of the condition to be controlled.

4. In combination, a device to be positioned in a plurality of positions for controlling the value of a condition, a control potentiometer including a resistance element and a slider element, means for moving the elements with respect to each other in accordance with changes in the value of the condition to be controlled, a relay including an armature and a pair of series connected relay coils for controlling the operation of the device, first connections between the ends of the resistance element and one end of each relay coil, second connections between the slider element and the junction of the relay coils, a balancing potentiometer including a resistance element and a slider element, means operated by said device for moving the elements of the balancing potentiometer with respect to each other, third connections between the ends of the balancing potentiometer and the first mentioned ends of the relay coils, fourth connections between the balancing potentiometer slider element and the junction of the relay coils whereby the device is positioned in accordance with variation in the value of the condition to be controlled, resilient means for mechanically adjusting the armature of the relay, and means responsive to the current flow through the first and third connections for adjusting the resilient means to position said device differently with respect to the value of the condition to be controlled.

5. In combination, a device to be positioned in a plurality of positions for controlling the value of a condition, adjustable control impedance means adjusted in accordance with changes in the value of the condition to be controlled, follow-up means operated as an incident to operation of the device, relay means in control of said device and operated by said control impedance means and said follow-up means for positioning said device in accordance with the adjustment of said control impedance means for maintaining the condition within certain limits, resilient means mechanically connected to said relay means for also controlling the operation thereof, and means for adjusting said resilient means for positioning said device differently with respect to the value of the condition to be controlled.

6. In combination, a device to be positioned in a plurality of positions for controlling the value of a condition, adjustable control impedance means adjusted in accordance with changes in the value of the condition to be controlled, follow-up means operated as an incident to operation of the device, relay means in control of said device and operated by said control impedance means and said follow-up means for positioning said device in accordance with the adjustment of said control impedance means for maintaining the condition within certain limits, resilient means mechanically connected to said relay means for also controlling the operation thereof, and means operative as an incident to deviation of the value of the condition from the desired normal value for adjusting said resilient means additionally to position the device with respect to the adjustment of the control impedance means for returning the value of the condition toward the desired normal value.

7. In combination, a device to be positioned in a plurality of positions for controlling the value of a condition, adjustable control impedance means adjusted in accordance with changes in the value of the condition to be controlled, adjustable balancing impedance means adjusted as an incident to operation of the device, relay means in control of said device for controlling the direction and extent of operation of the device, connections between the control impedance means, the balancing impedance means and the relay means for controlling the relay means in accordance with the adjustments of the control and balancing impedance means to position the device in accordance with the adjustment of the control impedance means to maintain the condition within certain limits, resilient means mechanically connected to the relay means for also controlling the operation thereof, and means operative as an incident to deviation of the value of the condition from the desired normal value for adjusting said resilient means additionally to position the device with respect to the adjustment of the control impedance means for returning the value of the condition toward the desired normal value.

8. In combination, a device to be positioned in a plurality of positions for controlling the value of a condition, adjustable control impedance means adjusted in accordance with changes in the value of the condition to be controlled, adjustable balancing impedance means adjusted as an incident to operation of the device, relay means in control of said device for controlling the direction and extent of operation of the device, connections between the control impedance means, the balancing impedance means and the relay means for controlling the relay means in accordance with the adjustment of the control and balancing impedance means to position the device in accordance with the adjustment of the control impedance means to maintain the condition within certain limits, resilient means mechanically connected to the relay means for also controlling the operation thereof, and means responsive to the current flow in said connections for adjusting said resilient means additionally to position the device with respect to the adjustment of the control impedance means for returning the value of the condition toward the desired normal value.

9. In combination, a device to be positioned in a plurality of positions for controlling the value of a condition, adjustable control impedance means adjusted in accordance with changes in the value of the condition to be controlled, adjustable balancing impedance means adjusted as an incident to operation of the device, relay means in control of said device for controlling the direction and extent of operation of the device, connections between the control impedance means, the balancing impedance means and the relay means for controlling the relay means in accordance with the adjustment of the control and balancing impedance means to position the device in accordance with the adjustment of the control impedance means to maintain the condition within certain limits, resilient means mechanically connected to the relay means for also controlling the operation thereof, and thermoelectric means responsive to the current flow in said connections for adjusting said resilient means additionally to position the device with respect to the adjustment of the control impedance means for returning the value of the condition toward the desired normal value.

10. In combination, a device to be positioned in a plurality of positions for controlling the value of a condition, adjustable control impedance means adjusted in accordance with changes in the value of the condition to be controlled, adjustable balancing impedance means adjusted as an incident to operation of the device, relay means in control of said device for controlling the direction and extent of operation of the device, connections between the control impedance means, the balancing impedance means and the relay means for controlling the relay means in accordance with the adjustment of the control and balancing impedance means to position the device in accordance with the adjustment of the control impedance means to maintain the condition within certain limits, resilient means mechanically connected to the relay means for also controlling the operation thereof, thermostatic means for adjusting the resilient means, and heating means responsive to the current flow in said connections for heating the thermostatic means additionally to position the device with respect to the adjustment of the control impedance means for returning the value of the condition toward the desired normal value.

11. In combination, a device to be positioned in a plurality of positions for controlling the value of a condition, adjustable control impedance means adjusted in accordance with changes in the value of the condition to be controlled, adjustable balancing impedance means adjusted as an incident to operation of the device, relay means in control of said device for controlling the direction and extent of operation of the device, first connections between the control impedance means and the relay means and second connections between the balancing impedance means and the relay means for controlling the relay means in accordance with the adjustment of the control and balancing impedance means to position the device in accordance with the adjustment of the control impedance means to maintain the condition within certain limits, resilient means mechanically connected to the relay means for also controlling the operation thereof, and means responsive to the current flow in the first connections for adjusting said resilient means additionally to position the device with respect to the adjustment of the control impedance means for returning the value of the condition toward the desired normal value.

12. In combination, a device to be positioned in a plurality of positions for controlling the value of a condition, adjustable control impedance means adjusted in accordance with changes in the value of the condition to be controlled, adjustable balancing impedance means adjusted as an incident to operation of the device, relay means in control of said device for controlling the direction and extent of operation of the device, first connections between the control impedance means and the relay means and second connections between the balancing impedance means and the relay means for controlling the relay means in accordance with the adjustment of the control and balancing impedance means to position the device in accordance with the adjustment of the control impedance means to maintain the condition within certain limits, resilient means mechanically connected to the relay means for also controlling the operation thereof, and means responsive to the current flow in the first and second connections for adjusting said resilient means additionally to position the device with respect to the adjustment of the control impedance means for returning the value of the condition toward the desired normal value.

13. In combination, a device to be positioned in a plurality of positions for controlling the value of a condition, adjustable control impedance means adjusted in accordance with changes in the value of the condition to be controlled, adjustable balancing impedance means adjusted as an incident to operation of the device, relay means in control of said device for controlling the direction and extent of operation of the device, connections between the control impedance means, the balancing impedance means and the relay means for controlling the relay means in accordance with the adjustment of the control and balancing impedance means to position the device in accordance with the adjustment of the control impedance means to maintain the condition within certain limits, resilient means mechanically connected to the relay means for also controlling the operation thereof, thermostatic means for adjusting the resilient means, heating means responsive to the current flow in said connections for heating the thermostatic means additionally to position the device with respect to the adjustment of the control impedance means for returning the value of the condition toward the desired normal value, and means for adjusting the heating effect of the heating means.

HENRY E. HARTIG.